(12) United States Patent
Sbongk et al.

(10) Patent No.: US 11,938,844 B2
(45) Date of Patent: Mar. 26, 2024

(54) MOUNTING DEVICE

(71) Applicant: ILLINOIS TOOL WORKS INC., Glenview, IL (US)

(72) Inventors: Albert Sbongk, Niederstetten (DE); Manuel Hübner, Aub (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 152 days.

(21) Appl. No.: 17/498,298

(22) Filed: Oct. 11, 2021

(65) Prior Publication Data

US 2022/0118885 A1 Apr. 21, 2022

(30) Foreign Application Priority Data

Oct. 16, 2020 (DE) ..................... 10 2020 127 352.5
Aug. 26, 2021 (DE) ..................... 10 2021 122 129.3

(51) Int. Cl.
*B64D 11/00* (2006.01)
*B60N 2/015* (2006.01)
*B60N 2/90* (2018.01)

(52) U.S. Cl.
CPC ........... *B60N 2/0155* (2013.01); *B60N 2/919* (2018.02); *B60N 2002/952* (2018.02)

(58) Field of Classification Search
CPC ................. B60N 2/0155; B60N 2/919; B60N 2002/952; B60N 2/64; B60N 2002/684; B60N 2/01516; F16B 2/02
See application file for complete search history.

(56) References Cited

U.S. PATENT DOCUMENTS

2007/0194173 A1* 8/2007 Paasche ............... B60N 2/3043
244/118.5
2015/0136934 A1* 5/2015 Gordeenko ............ B60N 2/366
248/503.1

* cited by examiner

*Primary Examiner* — Amy J. Sterling
(74) *Attorney, Agent, or Firm* — THOMPSON HINE LLP

(57) ABSTRACT

A fastening apparatus, for a backseat bench of a motor vehicle, includes a housing installation with a fastening space for receiving a retaining section of a component to be fastened, wherein the housing installation is insertable in an assembly direction into a passage opening of a carrier component, and wherein the housing installation has an abutment section with an abutment surface extending transversely to the assembly direction at an end counter to the assembly direction for abutment on an edge of a carrier component facing counter to the assembly direction. A catching installation is provided with catching elements for connecting the fastening apparatus to a carrier component. The fastening apparatus further has a fastening installation with a catching means for releasably fixing a retaining section of a component to be fastened, wherein the fastening installation is arranged in front of the abutment section in the assembly direction.

12 Claims, 11 Drawing Sheets

MOUNTING DEVICE

TECHNICAL FIELD

The present invention relates to a fastening apparatus, in particular for a backseat bench of a motor vehicle.

BACKGROUND

Conventional fastening apparatuses for fastening a backseat bench to a carrier component of a motor vehicle are usually designed in a clip-like manner.

However, some of these fastening clips provide only a marginal retaining force.

In addition, releasable fastening clips are known, which provide higher retaining forces but which take up a very large design space between the carrier component and the backseat bench to be fastened.

SUMMARY

The problem addressed by the present invention is to provide a fastening apparatus, in particular for a backseat bench of a motor vehicle, that is simple to use and safe and reliable to operate.

In particular, a problem addressed by the present invention is to provide a fastening apparatus that requires only marginal design space.

A further problem addressed by the present invention is to provide a releasable fastening apparatus that is designed for repeated release and fastening of a retaining section of a component to be fastened.

One or more of these problems are addressed by the features of independent claim 1. Advantageous configurations are specified in the respective dependent subclaims.

According to the invention, a fastening apparatus, in particular for a backseat bench of a motor vehicle, is provided. Said apparatus comprises a housing installation with a fastening space for receiving a retaining section of a component to be fastened, wherein the housing installation is insertable, preferably in an assembly direction, into a passage opening of a carrier component, and wherein the housing installation has an abutment section with an abutment surface preferably extending transversely to the assembly direction at an end, in particular at an end counter to the assembly direction, for abutment on an edge of a carrier component preferably facing counter to the assembly direction. In addition, a catching installation is provided with catching elements for connecting the fastening apparatus to a carrier component. The fastening apparatus further has a fastening installation in the fastening space with a catching means for releasably fixing a retaining section of a component to be fastened.

The fastening apparatus according to the invention can be characterized, in particular, by the fact that the fastening installation is arranged in the assembly direction or in an insertion direction or in an axial direction forwardly towards the abutment section.

In the context of the present invention, the assembly direction and the insertion direction are understood to mean a direction that extends approximately orthogonally to an edge region or a surface of the carrier component that limits the passage opening of the carrier component. In addition, the assembly direction extends towards the carrier component.

The axial direction extends in the same direction as the assembly direction. The fastening space is preferably not a connected chamber.

According to the present invention, it is provided that at one end, in particular at an end of the fastening apparatus lying counter to the assembly direction, the abutment section is provided. In the assembly direction, the fastening apparatus thus firstly has the abutment section. The abutment section is then followed forwardly in the assembly direction by the fastening space, the catching installation, and the fastening installation, that is to say these are arranged after the abutment section in the assembly direction. Thus, the abutment section is designed in order to be arrangeable outside of a carrier component, and the fastening space, the catching installation, and the fastening installation are designed in order to be arranged within a carrier component.

In this way, the fastening apparatus can be arrangeable in a carrier component, in particular an area underneath a backseat bench in a motor vehicle, wherein only the abutment section projects out of the carrier component counter to the assembly direction. However, the latter has a very low height.

The fastening installation for releasably fixing a retaining section of a component to be fastened is therefore arranged in the assembly direction underneath the carrier component. In this way, the apparatus according to the invention requires a very marginal design space above a carrier component. Thus, it is not necessary to adapt the design or construction of a backseat bench to the fastening apparatus. The backseat bench can be freely designed and developed, because the fastening apparatus is arranged underneath the carrier component.

However, as described above, most fastening apparatuses for backseat benches of motor vehicles require a relatively large design space, particularly in the area between the carrier component and the backseat bench. In addition, these fastening apparatuses are usually not releasable. The fastening installation according to the invention with a catching means for detachable, in particular for releasable, fixing of a retaining section, allows a retaining section of a backseat bench to be released after fastening. In this way, as needed, the fastening apparatus does not need to be replaced every time the backseat bench is to be released.

Furthermore, the design of the fastening apparatus according to the invention provides a safe and reliable fixing of a retaining section of a component to be fastened, in particular of a backseat bench of a motor vehicle, which also allows a high retaining force.

The abutment section is preferably designed as a radially circumferential abutment collar. Due to the fact that the abutment section is designed as a radially circumferential abutment collar, forces acting contrary to the assembly direction that are applied to the fastening apparatus can be safely and reliably absorbed, as they are absorbed radially circumferentially via the abutment collar and transferred to a carrier component.

Furthermore, an actuating element, in accordance with this exemplary embodiment a pull strap, can be provided for releasing the catching means of the fastening apparatus. By providing a pull strap, a retaining section of a component to be fastened can be released from the fastening installation in a simple and safe manner.

The catching installation can comprise two catching elements arranged on opposite side walls of the housing installation and extending laterally outward, wherein the catching elements each have a catching edge for rear engagement with a surface of a carrier component facing in the assembly direction. By means of the two catching elements, which are arranged on opposite side walls of the housing installation, the fastening installation can be fixed/fastened safely and reliably in a carrier component.

Insertion slopes and/or guiding surfaces for inserting and guiding a retaining section of a component to be fastened can be integrally formed in the fastening space. In this way, the insertion of a retaining section is facilitated.

According to a first exemplary embodiment, the catching means of the fastening installation can be designed to be approximately L-shaped in cross-section and to extend preferably orthogonally or transversely to the assembly direction, wherein one leg is an actuating leg and one leg is arranged approximately orthogonally to the actuating leg and is a retaining leg designed in order to fix a retaining section of a component to be fastened, wherein the catching means is mounted rotatably in the housing installation in such a manner that the retaining leg is arranged preferably vertically, in particular parallel to the assembly direction or axial direction, in a home position and the actuating leg is accordingly arranged preferably horizontally, in particular orthogonally to the assembly direction or axial direction, and wherein, in a fixed position in which a retaining section is fixed by means of the retaining leg, the retaining leg is arranged preferably horizontally, in particular orthogonally to the assembly direction or axial direction, and the actuating leg is arranged preferably vertically, in particular parallel to the assembly direction or axial direction.

A fastening installation designed in such a way allows a safe and reliable retaining of a retaining section of a component to be fastened in a simple manner. At the same time, this fastening installation can also be released in a simple manner in order to release a retaining section of a component to be fastened.

In this context, a vertical arrangement is understood to mean an arrangement in which the corresponding leg is arranged approximately parallel to a side wall of the housing installation extending in the assembly direction. Accordingly, in this context, a horizontal arrangement is understood to mean a position in which the leg is arranged orthogonally to the assembly direction and accordingly orthogonally to a side wall of the housing installation.

A catching edge for retaining and fixing the catching legs in the fixed position can be provided on the actuating element or the pull strap, wherein the catching edge can be moved counter to the assembly direction by means of the pull strap in order to release the catching means.

The catching edge is thus designed in order to lock the retaining leg in the fixed position. The catching edge accordingly extends orthogonally to the assembly direction and points in the assembly direction. The catching edge is a component of the catching installation.

In order to release the catching means, the catching edge is moved counter to the assembly direction such that the retaining section is released and can be transferred counter to the assembly direction from the horizontal fixed position back into the vertical home position by a tensile force acting on the retaining section of the component to be fastened.

Alternatively, the catching edge can also be movable orthogonally to the assembly direction in order to release the catching means.

In particular, the actuating element can be connected to the catching means via an actuating structure.

A free end of the retaining leg can have a resetting lug, such that the retaining leg is fully transferred into the home position upon removal of the retaining section. This is achieved in particular due to the fact that the retaining section of a component to be fastened fully transfers the retaining leg back into the vertical home position via the protruding resetting lug. In this way, it is ensured that the L-shaped catching means of the fastening installation is correctly arranged in the home position.

Furthermore, a retaining surface of the retaining leg can be approximately concave in design. By a concave design of the retaining legs, a retaining section of a component to be fastened, which is usually round in cross section, is safely and reliably receivable and retainable in the retaining surface of the retaining leg.

Insertion slopes and/or guiding surfaces for inserting and guiding a retaining section of a component to be fastened can be integrally formed in the fastening space. By providing insertion slopes and/or guiding surfaces, the insertion of a retaining section of a component to be fastened into the fastening space of the fastening apparatus is facilitated. In addition, damage to the retaining section is avoided. A simple and safe assembly of the retaining section in the fastening apparatus is thus possible.

According to a second exemplary embodiment of the present invention, the fastening installation can have two fastening catching elements, wherein the fastening catching elements each comprise a retaining surface for fixing a retaining section of a component to be fastened, and wherein the fastening catching elements are preferably integrally formed on side wall sections of the housing installation, wherein the side wall sections are designed to be elastic transversely to the assembly direction or in lateral direction and are arranged preferably offset from one another in a top plan view.

The fastening installation according to the second exemplary embodiment uses at least two elastically designed fastening catching elements instead of an L-shaped and rotatably mounted fastening means. When inserting a retaining section of a component to be fastened into the fastening space, it is simply pushed laterally outward transversely to the assembly direction until the retaining section has passed through the fastening catching elements in the assembly direction. The fastening catching elements then safely and reliably lock behind the retaining section of the component to be fastened. This also allows a reliable fixing of a retaining section of a component to be fastened by means of the fastening apparatus according to the invention.

The pull strap can be coupled to a release wedge and designed in order to actuate this release wedge, wherein, in order to release the fixed position, the release wedge is movable counter to the assembly direction such that actuating surfaces of the release wedge inclined counter to the assembly direction, the fastening elements, and preferably the elastically designed side walls are movable outwardly transverse to the assembly direction.

By means of a corresponding pull on the pull strap, the release wedge moves counter to the assembly direction. The actuating surfaces inclined counter to the assembly direction then contact the elastic side wall sections on which the fastening elements are integrally formed. These are then also moved outwardly in the lateral direction such that a retaining section of a component to be fastened is released accordingly and can be pulled out of the fastening space counter to the assembly direction by means of a tensile force.

Once a pull is no longer applied to the pull strap, the spring force of the side wall sections is sufficiently strong in order to displace the release wedge in the assembly direction, such that the fastening catching elements are again arranged in the home position.

According to this exemplary embodiment, the home position corresponds to the fixed position. In the context of the present invention, however, the home position is understood to mean that no fastening section of a component to be fastened is arranged in the fastening space and fixed to the fastening catching elements. Accordingly, in the fixed position, a fastening section is fixed in the fastening space by means of the fastening catching elements.

A third exemplary embodiment of the present invention is designed essentially in accordance with the second exemplary embodiment. Here, the actuating element is designed as a lever installation, which is coupled to the releasing element, wherein, in order to release the fastening catching elements, the releasing element is rotatable by rotating the lever installation in such a manner that the fastening catching elements are slidable preferably orthogonally to the axial direction.

In addition, according to the present invention, methods for fastening and releasing a retaining section of a component to be fastened into and out of the fastening apparatus are provided.

BRIEF DESCRIPTION OF THE DRAWINGS

The present invention will be described in more detail in the following on the basis of three exemplary embodiments shown in the figures. The figures show.

DETAILED DESCRIPTION

Figure 1:
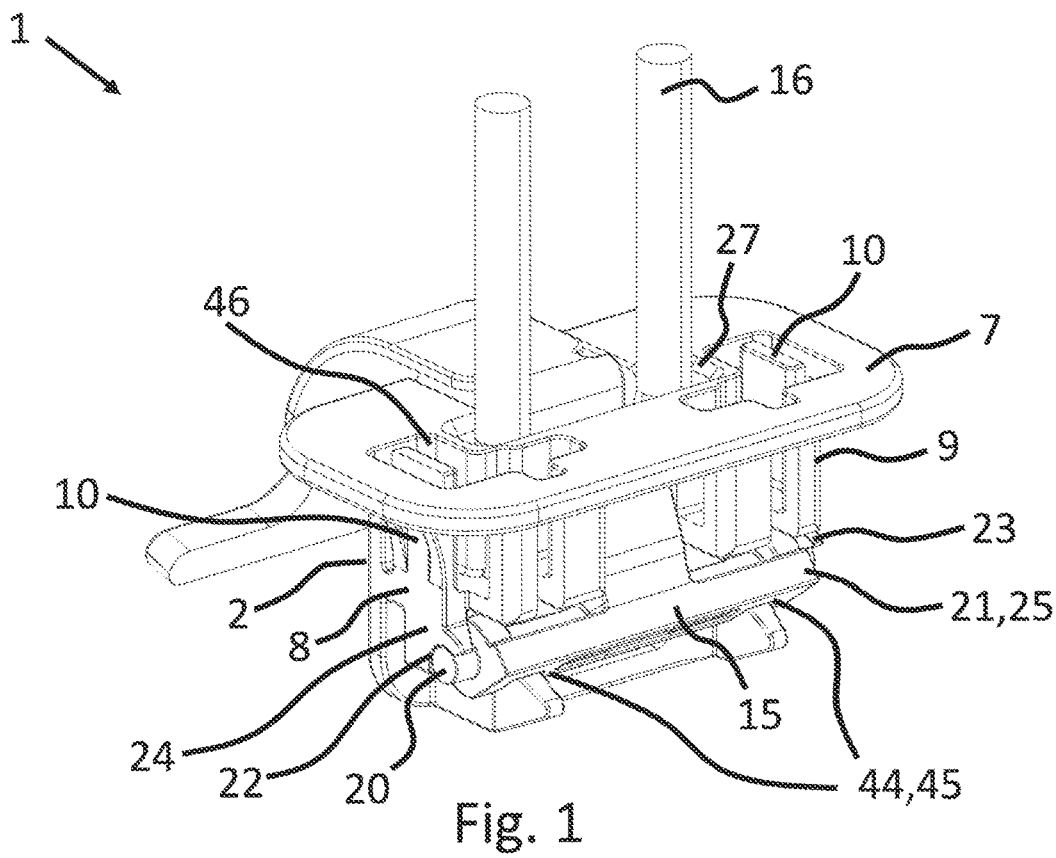
FIG. 1 a perspective view of a fastening apparatus according to the invention according to a first exemplary embodiment in a home position, FIG. 2 a perspective view of the fastening apparatus according to the invention in a fixed position, FIG. 3 a side-cut view of the fastening apparatus in a home position, FIG. 4 a side-cut view of the fastening apparatus in a fixed position, FIG. 5 a side view of the fastening apparatus in a home position, FIG. 6 a side view of the fastening apparatus in a fixed position, FIG. 7 a perspective view of a second exemplary embodiment of the fastening apparatus according to the invention.
Figure 2:
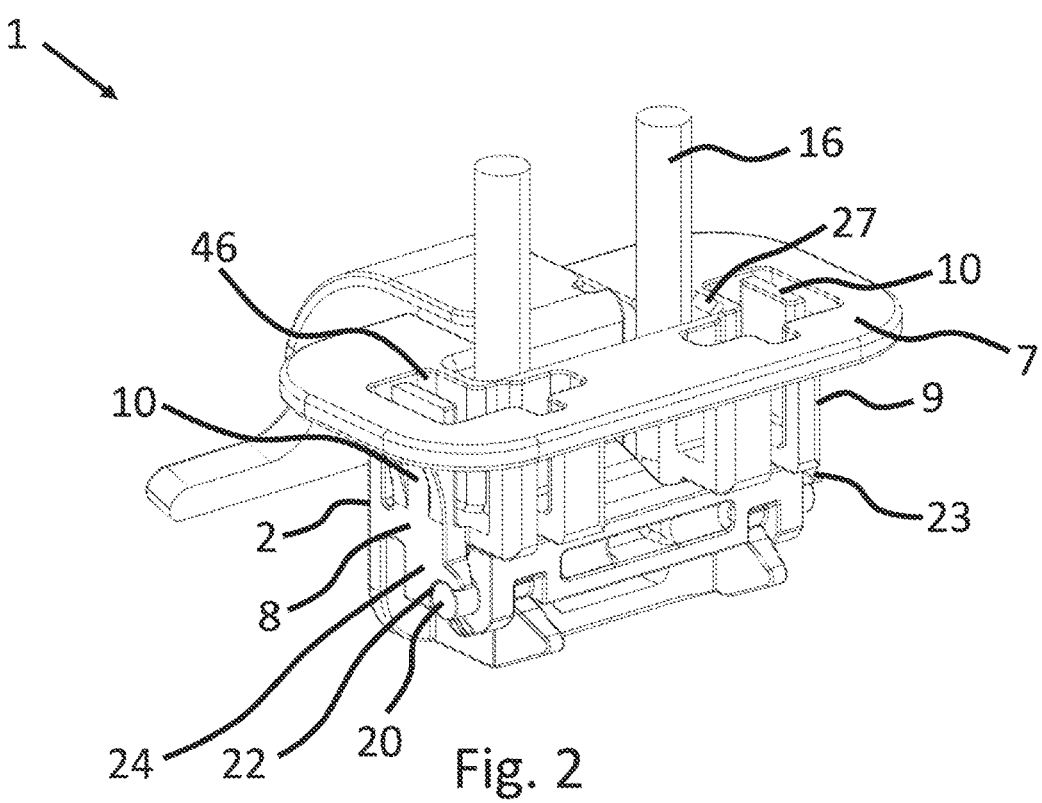
Figure 3:
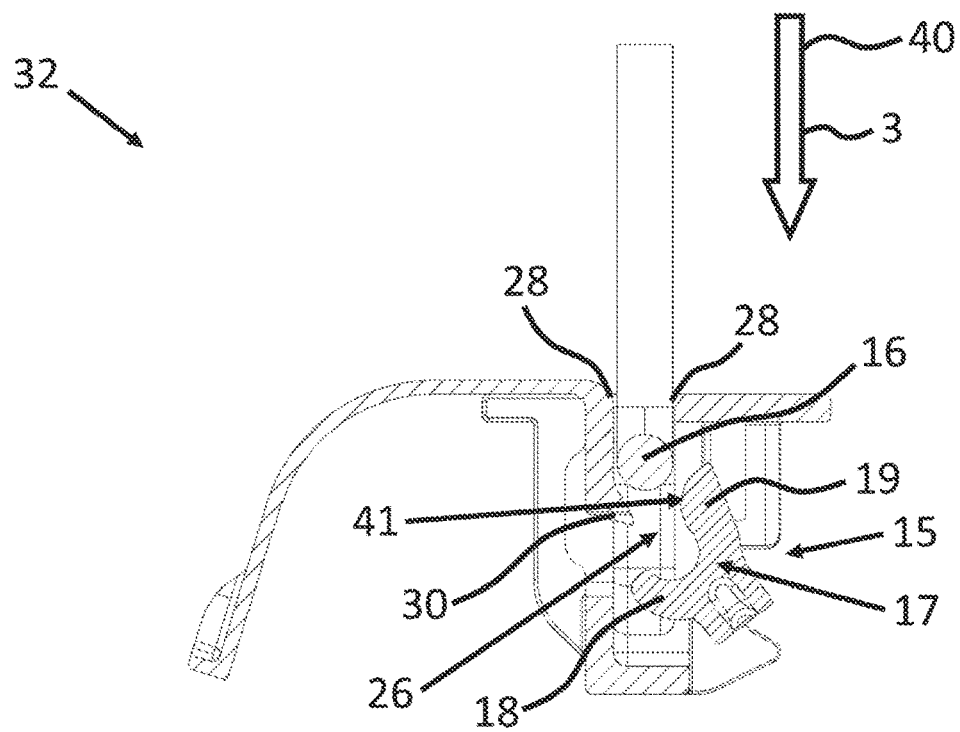
Figure 4:
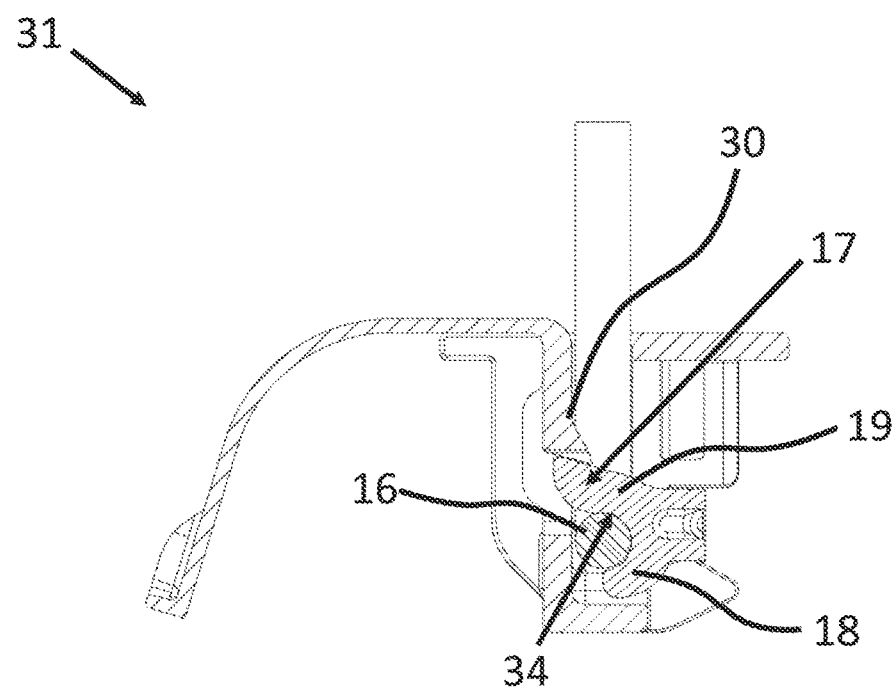
Figure 5:
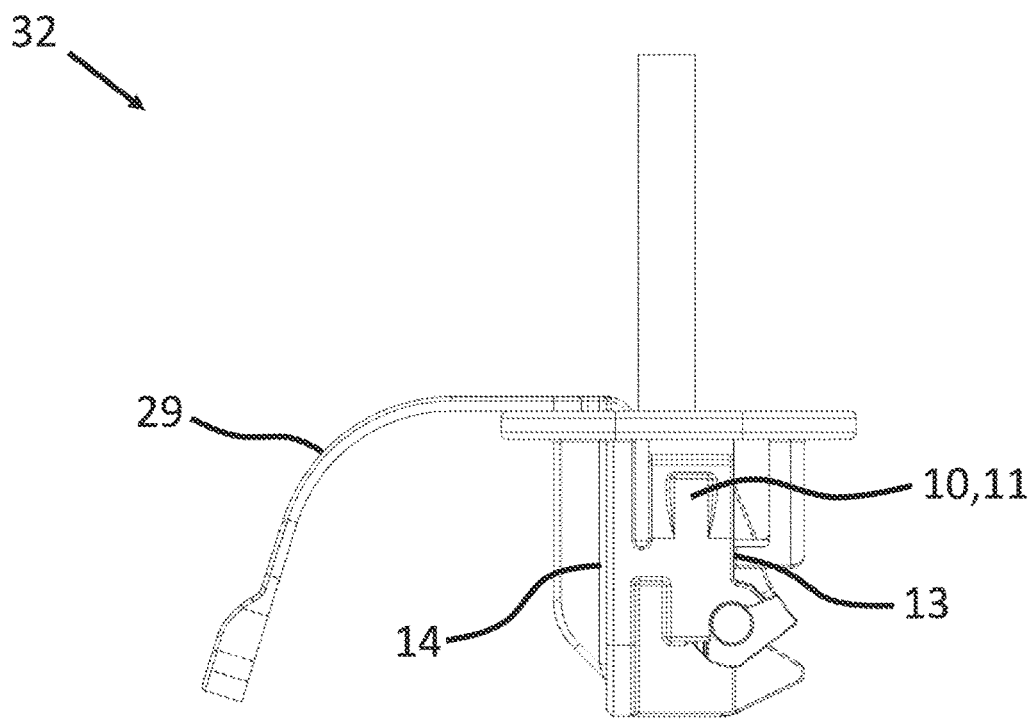
Figure 6:
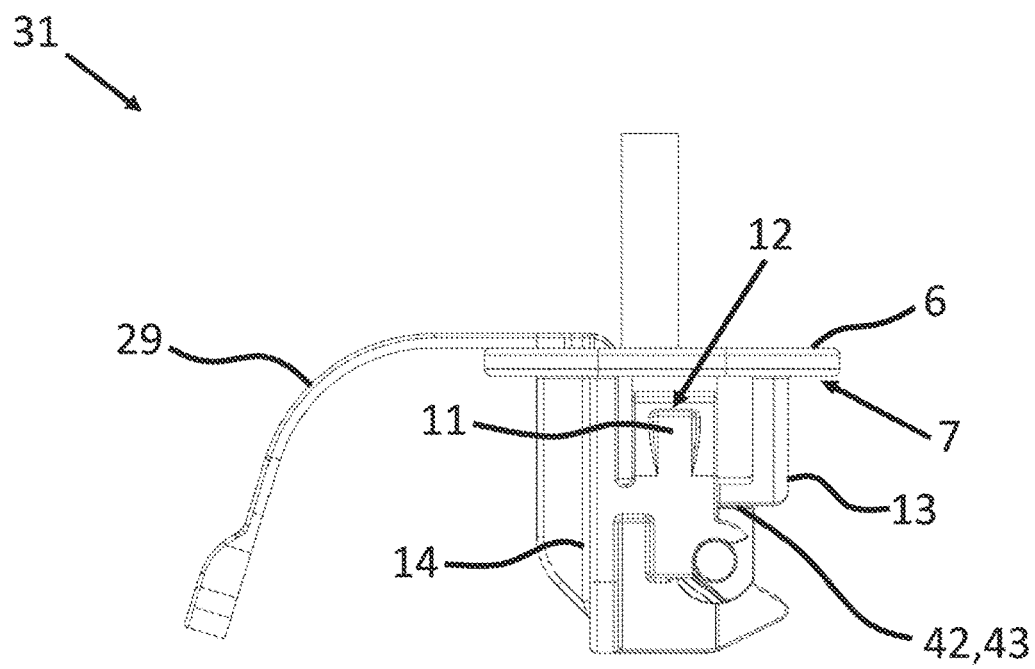

In the following, a fastening apparatus 1 according to the invention is described in more detail on the basis of a first exemplary embodiment (FIGS. 1 to 6). The fastening apparatus 1 is designed in order to fix a retaining section 16 of a backseat bench of a motor vehicle and thus to at least partially fasten a backseat bench (not shown). A retaining section 16 in the sense of the present invention is a section of a bracket having a preferably circular cross-section. With the fastening installation 1 according to the invention, various types of components having a corresponding fastening bracket with a retaining section can be fixed, in principle. The retaining section can also have another suitable shape in cross section.

The fastening apparatus 1 has a housing installation 2. The housing installation 2 is insertable in an assembly direction 3 into a passage opening (not shown) of a carrier component (not shown) and limits a fastening space 26 extending in an axial direction.

In the context of the present invention, the assembly direction 3 is understood to mean a direction that extends approximately orthogonally to an edge region or a surface of the carrier component that limits the passage opening of the carrier component. The assembly direction 3 also extends towards the carrier component.

The housing installation 2 has a radially circumferential abutment section, which is designed as an abutment collar 6, on an end counter to the assembly direction 3 or on a first end. The abutment collar 6 has an abutment surface 7, which extends orthogonally or transversely to the assembly direction 3 or transversely to an axial direction 40, for abutting an edge of a carrier component facing counter to the assembly direction 3. The abutment collar 6 is designed to be approximately rectangular in a top plan view.

The housing installation 2 is designed to be approximately cuboid, wherein a catching installation 10 for connecting the fastening apparatus 1 to a carrier component is provided on two short front walls 8, 9 which lie opposite to one another. The catching means 10 has two radially outwardly extending catching elements 11. The catching elements 11 are designed to be elastic, with corresponding catching edges 12 facing counter to the assembly direction 3.

Furthermore, the housing installation 2 comprises two long side walls 13, 14.

In the region of the side wall 13, a fastening installation 15 for releasably fixing a retaining section 16 of a backseat bench is provided.

The fastening installation 15 comprises a catching means 17. The catching means 17 is approximately L-shaped in cross-section and extends orthogonally or transversely to the assembly direction 3 or the axial direction 40, respectively. One leg of the catching means forms an actuating leg 18, and another leg forms a retaining leg 19. The retaining leg 19 is arranged approximately orthogonally to the actuating leg 18 and is designed in order to fix the retaining section 16 of a component to be fastened.

The catching means 17 is rotatably mounted in the side wall 13 or the front walls 8, 9. For rotatable mounting, the catching means comprises circular mounting sections 20, 21 at its two ends. The mounting sections 20, 21 are rotatably mounted and locked in corresponding mounting receptacles 22, 23 with corresponding insertion openings 24, 25 in the side wall 13. The insertion openings are accordingly designed in order to enclose the mounting section in a locking manner.

The retaining leg 19 is arranged preferably vertically in a home position parallel to the assembly direction 3 or the axial direction 40, and the actuating leg 18 is accordingly arranged preferably horizontally and orthogonally to the assembly direction 3 or the axial direction 40.

In a fixed position 31, in which a retaining section 16 of a component to be fastened is fixed by means of the retaining leg 19, the retaining leg 19 is arranged horizontally parallel to the assembly direction 3 or the axial direction, and the actuating leg 18 is arranged vertically orthogonally in the assembly direction 3.

In an home position 32, the retaining leg 19 is arranged preferably vertically orthogonally to the assembly direction 3 or the axial direction 40, and the actuating leg 18 is arranged preferably horizontally parallel to the assembly direction 3 or the axial direction 40.

In a contact area between the retaining leg 19 and a retaining section 16 of a component to be fastened, a retaining surface 34, which is approximately concave in shape, is provided on the retaining leg 19.

A free end of the retaining leg 19 has a resetting lug 41, which is approximately circularly segmented in cross-section and which projects into a fastening space 26 which is limited by the side walls 13, 14 and the end walls 8, 9. The retention lug 41 is designed such, upon removal from the retaining section 16, a retaining section contacts the resetting lug such that the catching means 17 is transferred back to a home position 32.

On the retaining leg 19, stop surfaces are provided bilaterally and approximately in and counter to the assembly direction 3.

In order to limit a rotational movement of the catching means 17 when transitioning from the home position 32 into the fixed position 31, fixing stop surfaces 42 are formed on the retaining leg 19 facing approximately counter to the assembly direction 3.

In the area of the side wall 13, counter-fixing stop surfaces 43 are provided, which are designed in order to correspond to the fixing stop surfaces.

In order to limit a rotational movement of the catching means 17 when transitioning from the fixed position 31 into the home position 32, exit stop surfaces 44 facing approximately in the assembly direction 3 are formed on the retaining leg 19.

In the area of the sidewall 13, counter-exit stop surfaces 45 are provided, which are designed in order to correspond to the exit stop surfaces 44.

Insertion slopes 27 are arranged in the fastening space 26, which taper in the assembly direction 3. The insertion slopes 27 are provided in the present exemplary embodiment on the front walls 8, 9, but can also be additionally and/or alternatively arranged on the side walls 13, 14.

The surfaces of the sidewalls 13, 14 facing into the fastening space 26 form guiding surfaces 28. The guiding surfaces 28 can additionally and/or alternatively also be provided on the front walls 8, 9.

The insertion slopes 27 and the guiding surfaces 28 facilitate the insertion of a retaining section 16 of a component to be fastened.

In addition, an actuating element 29, in particular a pull strap 29, is provided for releasing the catching means 17 of the fastening installation 15. The pull strap 29 has a releasing element 37 in the area of the catching means 17, in particular a catching edge 30 for retaining and fixing the retaining leg 19 in the fixed position 31. In order to release the catching means 17, the pull strap 29 is subjected to a tensile force, preferably orthogonally to the assembly direction, so that the catching edge 30 moves counter to the assembly direction 3 and releases the retaining leg 19, such that the apparatus 1 is transferable into the home position 32.

Alternatively, in order to release the catching means 17, the catching edge 30 can be subjected to a tensile force such that the catching edge 30 is moved orthogonally to the assembly direction 3 and releases the retaining leg 19 such that the apparatus 1 is transferable into the home position 32.

Furthermore, disassembly recesses 46 are designed in the abutment section in the area of the catching elements. The catching elements 11 can be actuated or released via the disassembly recesses 46, such that the fastening apparatus can be released or disassembled from a passage opening of a carrier component.

In the following, a method for actuating the fastening apparatus 1 according to the invention is briefly explained. This method includes the following steps:

Insertion of a retaining section 16 into the fastening space 26 of the fastening apparatus 1 in the assembly direction 3;

Contact of the retaining section 16 with the actuating leg 18 and transfer of the catching means into the fixed position 31;

Rear engagement of the retaining leg 19 behind the catching edge 30 of the actuating element 29.

For the release of the retaining section 16 from the fastening apparatus, a method is provided comprising the following steps:

Movement of the retaining section 16 counter to the assembly direction 3 and simultaneous pulling on the pull strap 29 such that the catching edge 30 is moved in the assembly direction and releases the retaining leg 19;

Release of the retaining section 16 from the fastening space 26 and transfer of the catching means 17 from the fixed position 31 into the home position 32.

Figure 7:
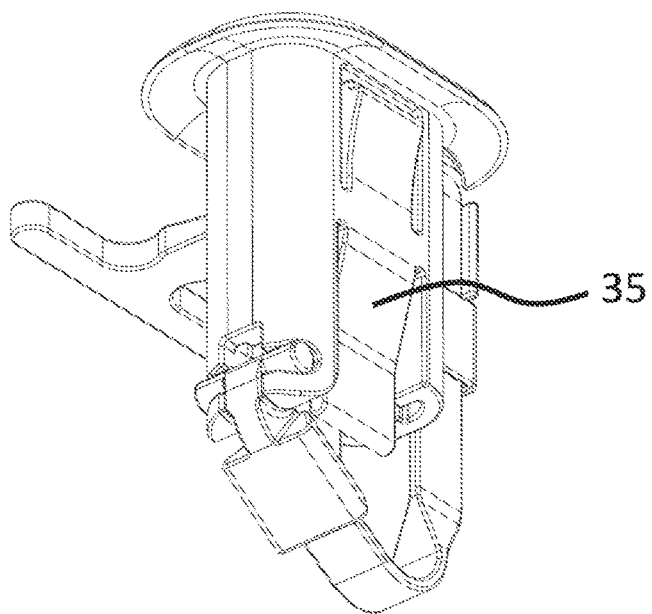
Figure 8:
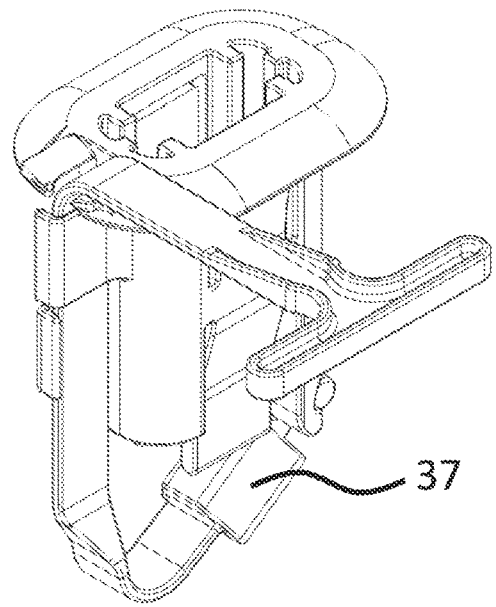
FIG. 8 a further perspective view of the fastening apparatus according to the invention, FIG. 9 a further perspective view of the fastening apparatus according to the invention, FIG. 10 a side view of the fastening apparatus according to the invention, FIG. 11 a top plan view of the fastening apparatus, FIG. 12 a side-cut view of the fastening apparatus in a fixed position, FIG. 13 a side-cut view of the fastening apparatus in a home position, FIG. 14 a perspective view of a third exemplary embodiment of the fastening apparatus according to the invention.
Figure 9:
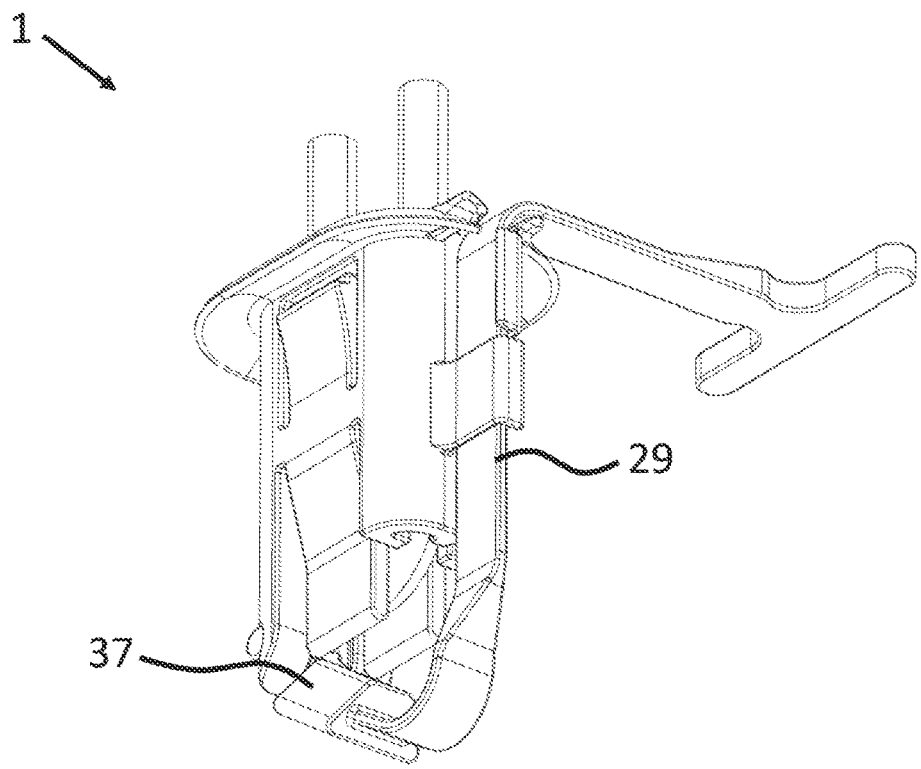
Figure 10:
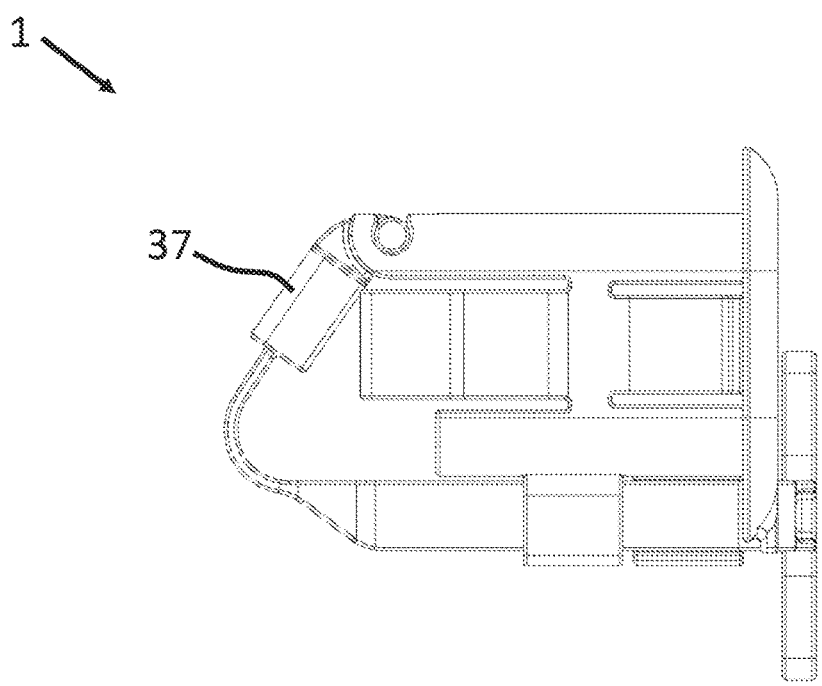
Figure 11:
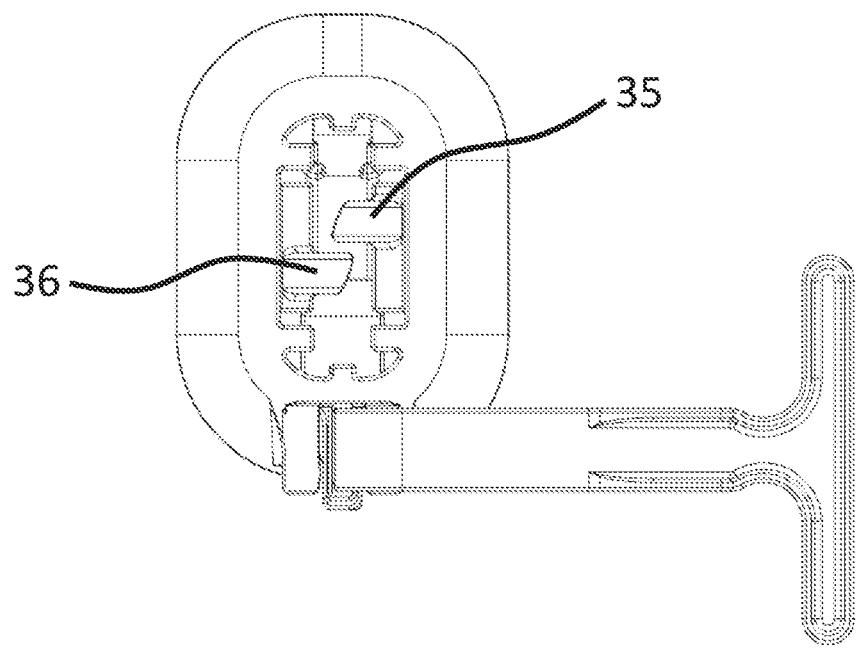
Figure 12:
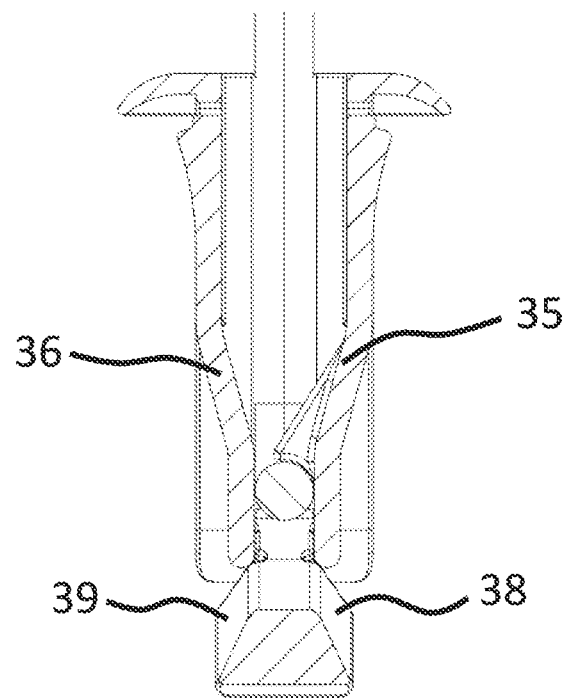
Figure 13:
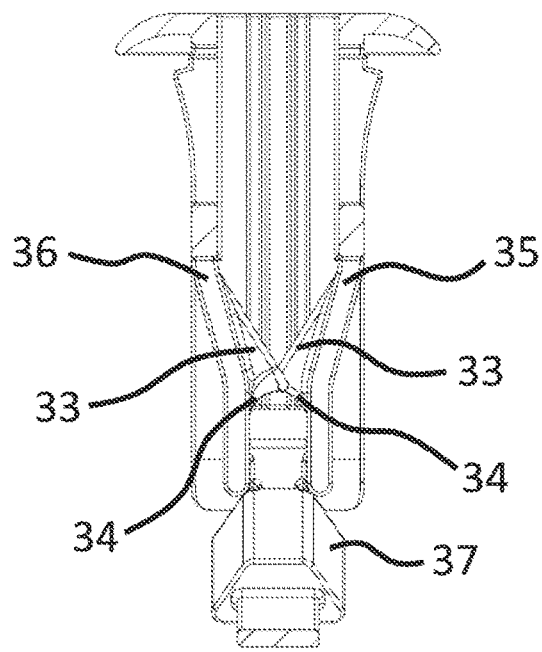
Figure 14:
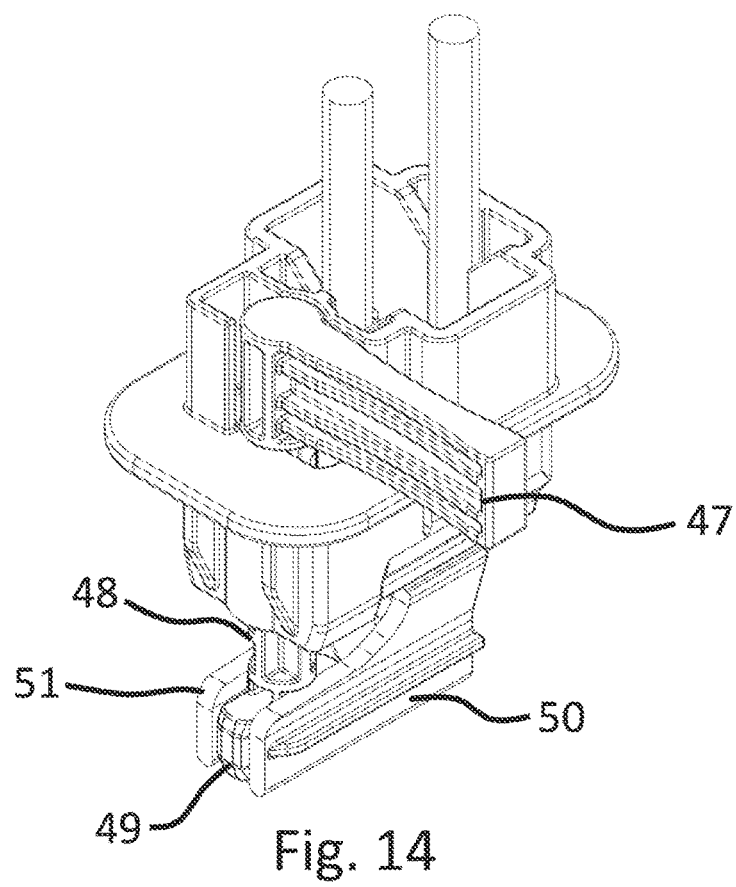
Figure 15:
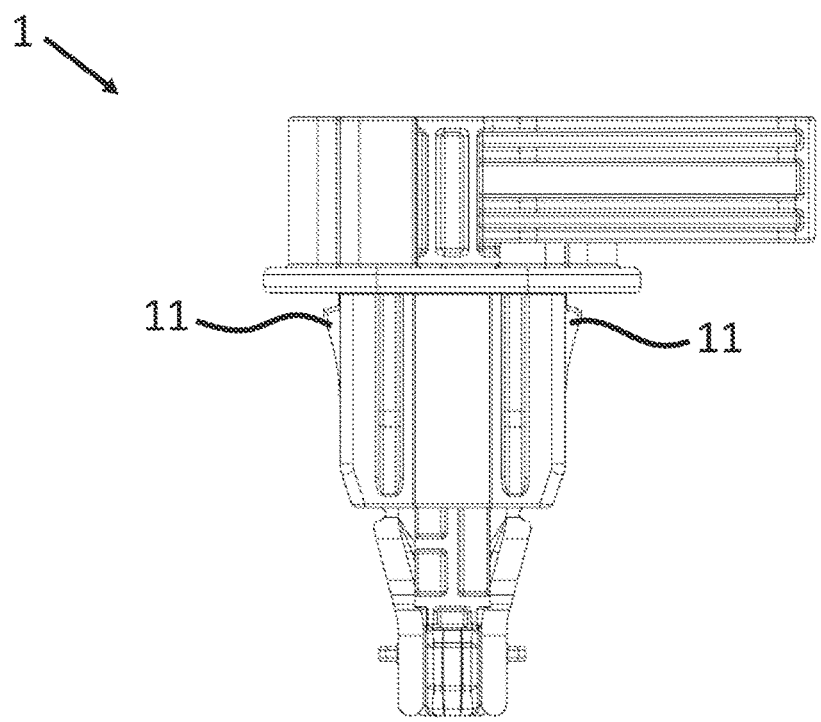
FIG. 15 a side view of the fastening apparatus in a fixed position.
Figure 16:
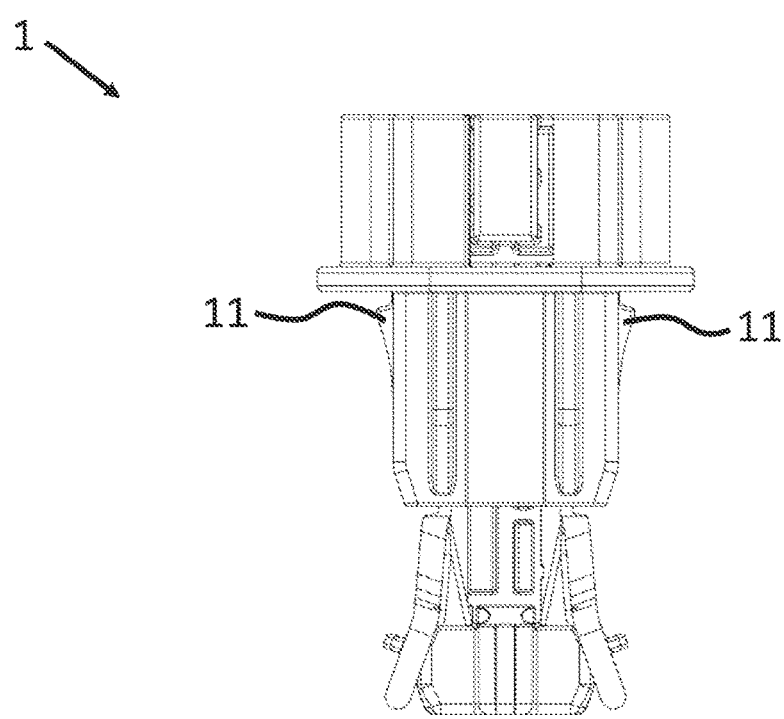
FIG. 16 a side view of the fastening apparatus in an opened position.

In the following, the fastening apparatus 1 according to the invention is described in more detail on the basis of a second exemplary embodiment (FIGS. 7 to 16). Unless described otherwise, the second exemplary embodiment has the same technical features as the first exemplary embodiment. Identical components bear the same reference numerals.

According to the second exemplary embodiment, the fastening installation 1 has two fastening catching elements 33. The fastening catching elements 33 each have a retaining surface 34 for fixing a retaining section 16 of a component to be fastened. The retaining surfaces 34 face approximately in the assembly direction 3.

The fastening catching elements 33 are fastened to elastic side wall sections 35, 36 of the side walls 13, 14. The side wall sections 35, 36 are designed in order to be elastic in particular transversely to the assembly direction 3. In a top plan view, the fastening catching elements 33 are arranged offset from one another or in alternating fashion, meaning that a fastening catching element 33 is integrally formed on a sidewall section 35 and a fastening element 33 is integrally formed on an opposing side wall section 36.

Alternatively, the side wall sections 35, 36 and/or the side walls can also be rigid in design, wherein only the fastening catching elements 33 are designed elastically orthogonally or transversely to the assembly direction 3.

Also according to this exemplary embodiment, an actuating element, in particular a pull strap 29, is provided, wherein the pull strap 29 is coupled to a releasing element, in particular a release wedge 37. The pull strap 29 is accordingly designed in order to actuate the release wedge 37.

In order to release the fixed position, the release wedge 37 can be moved counter to the assembly direction 3 by means of the pull strap 29. The release wedge has two actuating surfaces 38, 39 inclined counter to the assembly direction.

Upon a movement of the release wedge 37 counter to the assembly direction 3, free ends of the side wall sections 35, 36 located frontwards in the assembly direction slide along the actuating surfaces 38, 39 and are thus moved laterally outward. In this way, the fastening catching elements 33 coupled to the side wall sections 35, 36 release the retaining section 16 of the component to be fastened, such that it can be pulled out of the fastening space 26 counter to the assembly direction 3.

In the following, a corresponding method according to the second exemplary embodiment is briefly described. This method includes the following steps:
Insertion of a retaining section 16 of a component to be fastened into the fastening space 26 in the assembly direction,
Contact of the fastening section 16 with surfaces of the actuating catching elements 33 facing in the assembly direction, whereby the actuating catching elements 33 and the associated side wall sections 35, 36 are bent outwardly,
Rear engagement of the retaining surfaces 34 of the fastening catching elements on a surface of the retaining section 16 facing counter to the assembly direction.

In this way, the retaining means 16 is safely and reliably fixed in the fastening apparatus 1.

A corresponding method for releasing or transferring from the fixed position 31 into the home position 32 comprises the following steps:
Application of a tensile force on the actuating element or the pull strap 29, whereby a release wedge 37 is moved counter to the assembly direction 3,
Pushing the fastening catching elements 33 apart or laterally outwards by means of the release wedge, whereby the retaining surfaces 34 are released from the retaining means 16,
Movement of the retaining section 16 counter to the assembly direction,
Transfer into the home position 32.

Figure 17:
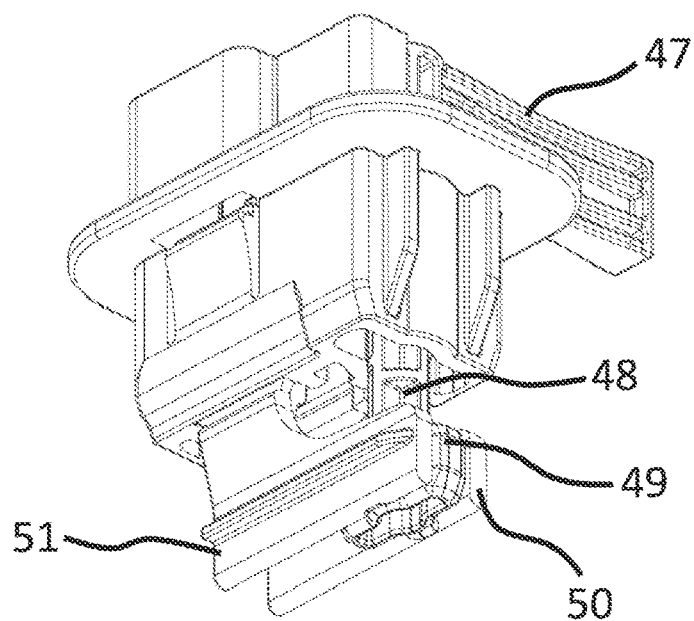
FIG. 17 a perspective view of the fastening apparatus.
Figure 18:
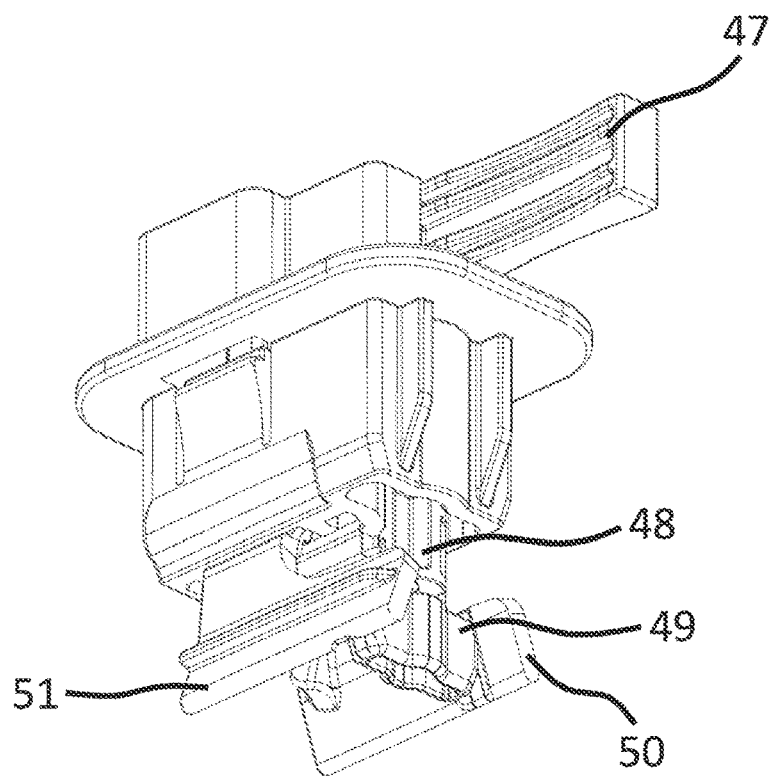
FIG. 18 a perspective view of the fastening apparatus in an opened position.
Figure 19:
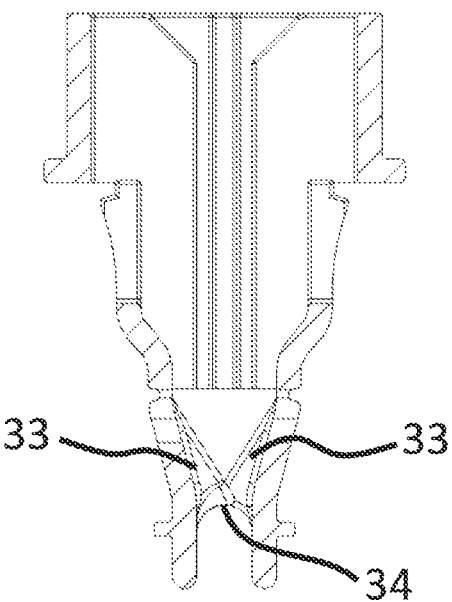
FIG. 19 a side-cut view of the fastening apparatus.
Figure 20:
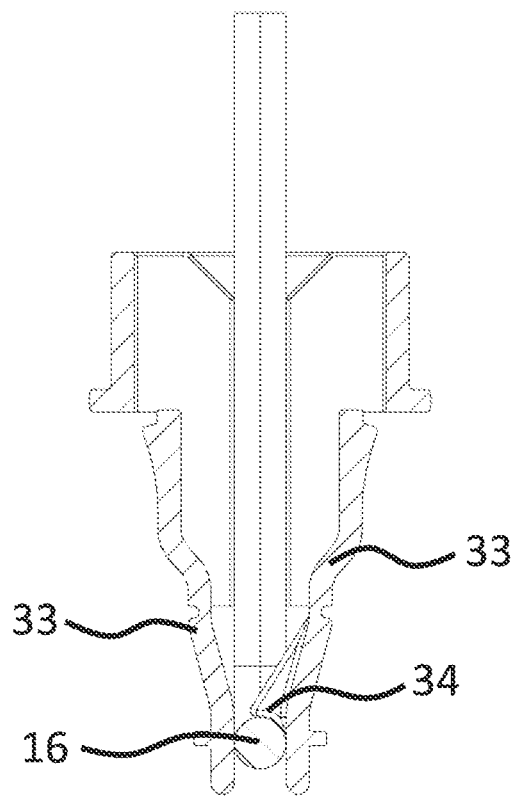
FIG. 20 a side-cut view of the fastening apparatus in a fixed position.
Figure 21:
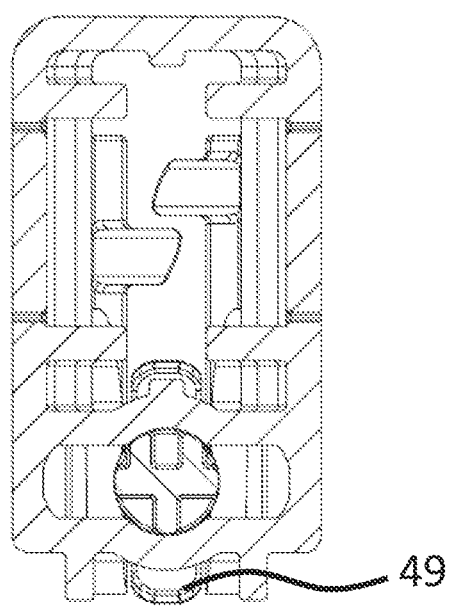
FIG. 21 a cross-section through the fastening apparatus.

According to a third exemplary embodiment, the fastening apparatus 1 according to the invention essentially corresponds to the fastening apparatus according to the invention according to the second exemplary embodiment (FIGS. 15 to 21). Unless otherwise described, this fastening apparatus has the same technical features as the fastening apparatus 1 according to the second embodiment.

Thus, the fastening apparatus also comprises two fastening catching elements 33 with a respective retaining surface 34 for fixing a retaining section 16 of a component to be fastened. The retaining surfaces 34 face approximately in the assembly direction 3 and are concavely formed in order to abut a cross-section of the retaining section 16.

The fastening catching elements 33 are also fastened to elastic side wall sections 35, 36 of the side wall 13, 14.

According to this exemplary embodiment, the actuating element is designed in a lever-like manner, wherein the actuating element 29 comprises a lever installation having a lever section 47, a shaft section 48, and a releasing element 37, in particular an expanding element 49.

The lever section 47 extends approximately orthogonally to the assembly direction 3 or the axial direction 4 and is rotatably mounted in the housing installation 2 about a longitudinal axis of the shaft section 48 that runs in the axial direction 40.

At a forward end in the assembly direction 3, the expanding element 49 is formed on the shaft section 48.

In accordance with this exemplary embodiment, it is provided that the elastic side wall sections 35, 36 are elongated with actuating sections 50, 51 in the axial direction 40.

The actuating sections 50, 51 are thus arranged at an end of the fastening apparatus 1 lying at the front in the assembly direction 3. In the area between the actuating elements 50, 51, the expanding element 49 is received such that, by a rotation of the shaft section 48, preferably by means of the lever section 47, preferably by 90°, the fastening catching elements or the corresponding side wall sections 35, 36, can be pushed preferably approximately orthogonally to the assembly direction 3 or outwardly such that the corresponding retaining surfaces 34 of the fastening catching elements 33 release the retaining section 16.

In the following, a corresponding method according to the third exemplary embodiment of the fastening apparatus 1 is briefly described. This method includes the following steps:
Insertion of a retaining section 16 of a component to be fastened into the fastening space 26 in the assembly direction 3,
Contact of the fastening section 16 with the side wall sections 35, 36 such that the actuating catching elements 33 are pushed outwardly,
Rear engagement of the retaining surfaces 34 of the fastening catching elements on a surface of the retaining section 16 facing counter to the assembly direction,
Transfer into the fixed position 31.

In this way, the retaining means 16 is safely and reliably fixed in the fastening apparatus.

A corresponding method for releasing or transferring from the fixed position 31 into the home position 32 comprises the following steps:
Rotation of the lever section 47 of the actuating element about a longitudinal axis of a shaft section 48, preferably by 90°, whereby actuating sections 50, 51 are bent apart by means of the expanding element 49 such that the retaining surfaces 34 release the retaining section 16,
Movement of the retaining section 16 counter to the assembly direction,
Transfer into the home position 32.

The technical features demonstrated above on the basis of the three exemplary embodiments can be combined as desired with one another, insofar as technically sensible.

LIST OF REFERENCE NUMERALS

1 Fastening apparatus
2 Housing installation
3 Assembly direction
4 Passage opening
5 Carrier component
6 Abutment collar
7 Abutment surface
8 End wall
9 End wall
10 Catching installation 11 Catching element
12 Catching edge
13 Side wall
14 Side wall
15 Fastening installation
16 Retaining section
17 Catching means
18 Actuating leg
19 Retaining leg
20 Mounting section
21 Mounting section
22 Mounting receptacle
23 Mounting receptacle
24 Insertion opening
25 Insertion opening
26 Fastening space
27 Insertion slope
28 Guiding surface
29 Pull strap
30 Catching edge
31 Fixed position
32 Home position
33 Fastening catching element
34 Retaining surface
35 Side wall section
36 Side wall section
37 Releasing element
38 Actuating surface
39 Actuating surface
40 Axial direction
41 Resetting lug
42 Fixing stop surface
43 Counter-fixing stop surface
44 Exit stop surface
45 Counter-exit stop surface
46 Disassembly recess
47 Lever section
48 Shaft section
49 Expanding element
50 Actuating section
51 Actuating section

The invention claimed is:

1. A fastening apparatus, for a backseat bench of a motor vehicle, comprising:
a housing installation with a fastening space extending in an axial direction for receiving a retaining section of a component to be fastened, wherein the housing installation is insertable into a passage opening of a carrier component, and wherein the housing installation has an abutment section for abutting an edge of a carrier component, and
a catching installation having catching elements for connecting the fastening apparatus to a carrier component, and
wherein a fastening installation is arranged in the fastening space with a catching means for releasably fixing a retaining section of a component to be fastened.

2. The fastening apparatus according to claim 1, wherein
the fastening space with the fastening installation is arranged forwardly in an axial direction towards the abutment section, wherein the abutment section is designed as a radially circumferential abutment collar.

3. The fastening apparatus according to claim 1, wherein
an actuating element for manually releasing the catching means of the fastening installation is provided, wherein the actuating element is connected to the catching means via an actuating structure.

4. The fastening apparatus according to claim 1, wherein
the catching means comprises two catching elements, which are arranged on opposite side walls of the housing installation and extend laterally outward, wherein the catching elements each have a catching edge for rear engagement with a surface of a carrier component.

5. The fastening apparatus according to claim 1, wherein
insertion slopes and/or guiding surfaces are integrally formed in the fastening space for the insertion and guiding of a retaining section of a component to be fastened.

6. The fastening apparatus according to claim 1, wherein
the catching means of the fastening installation is designed to be approximately L-shaped in cross-section, wherein one leg is an actuating leg and one leg is arranged approximately orthogonally to the actuating leg and is a retaining leg designed in order to fix a retaining section of a component to be fastened, wherein the catching means is mounted rotatably in the housing installation in such a manner that the retaining leg is arranged parallel to the axial direction in a home position and the actuating leg is accordingly arranged orthogonally to the axial direction, and wherein, in a fixed position in which a retaining section is fixed by means of the retaining leg, the retaining leg is arranged orthogonally to the axial direction and the actuating leg is arranged parallel to the axial direction.

7. The fastening apparatus according to claim 6, wherein
the actuating element is a pull strap, wherein at least one section of the pull strap arranged in the area of the housing installation is designed to be rigid, and, in this section, a catching edge is provided in the area of the catching means for retaining and fixing the catching leg in the fixed position, wherein, in order to release the catching means, the catching edge can be moved in the axial direction towards the abutment section by means of the pull strap.

8. The fastening apparatus according to claim 1, wherein
the catching means of the fastening installation is formed by two fastening catching elements, wherein the fastening catching elements each have a retaining surface for fixing a retaining section of a component to be fastened, and wherein the fastening catching elements are integrally formed on side wall sections of the housing installation, wherein these side wall sections are elastic in design.

9. The fastening apparatus according to claim 8, wherein
the actuating element is a pull strap, wherein the pull strap is coupled to a release wedge, wherein, in order to release the fastening catching elements, the release wedge is slidable in the axial direction towards the abutment section, such that the fastening catching elements are slidable orthogonally to the axial direction.

10. The fastening apparatus according to claim 8, wherein
the actuating element is a lever installation coupled to a releasing element, wherein, in order to release the fastening catching elements, the releasing element is rotatable by rotating the lever installation in such a manner that the fastening catching elements are slidable orthogonally to the axial direction.

11. The fastening apparatus according to claim 1, wherein the abutment section includes an abutment surface facing in an assembly direction, wherein the catching elements include catching edges spaced apart from the abutment surface in the assembly direction.

12. A fastening apparatus, for a backseat bench of a motor vehicle, comprising:
a housing installation with a fastening space extending in an axial direction for receiving a retaining section of a component to be fastened, wherein the housing installation is insertable into a passage opening of a carrier component, and wherein the housing installation has an abutment collar for abutting an edge of the carrier component, the abutment collar extending around an opening into the fastening space, and
a catching installation having catching elements for connecting the fastening apparatus to the carrier component, the catching elements include catching edges disposed below the abutment collar, and
wherein a fastening installation is arranged in the fastening space with a catching means for releasably fixing the retaining section of the component to be fastened.

\* \* \* \* \*